United States Patent
Branson et al.

(10) Patent No.: US 8,791,701 B2
(45) Date of Patent: Jul. 29, 2014

(54) ELECTROMAGNETIC PROXIMITY DETECTION METHOD AND UNIT

(75) Inventors: Simon Branson, Whiston (GB); Ping Wang, Walsall (GB)

(73) Assignee: Leica Geosystems AG, Heerbrugg (CH)

( * ) Notice: Subject to any disclaimer, the term of this patent is extended or adjusted under 35 U.S.C. 154(b) by 186 days.

(21) Appl. No.: 13/580,939

(22) PCT Filed: Feb. 24, 2011

(86) PCT No.: PCT/EP2011/052769
§ 371 (c)(1),
(2), (4) Date: Sep. 12, 2012

(87) PCT Pub. No.: WO2011/104314
PCT Pub. Date: Sep. 1, 2011

(65) Prior Publication Data
US 2013/0002256 A1    Jan. 3, 2013

(30) Foreign Application Priority Data
Feb. 25, 2010 (EP) .................................. 10154738

(51) Int. Cl.
*G01V 3/08* (2006.01)
(52) U.S. Cl.
USPC ............. 324/326; 324/329; 324/67; 324/642; 324/334; 702/27; 702/28; 175/45; 367/128
(58) Field of Classification Search
USPC ........... 324/326–329, 67, 642, 542, 334–341; 702/27–28; 175/45; 367/128
See application file for complete search history.

(56) References Cited

U.S. PATENT DOCUMENTS

| | | |
|---|---|---|
| 4,085,360 A | 4/1978 | Howell |
| 4,147,973 A * | 4/1979 | Weber ........................... 324/326 |
| 4,438,401 A | 3/1984 | Iwamoto et al. |

(Continued)

FOREIGN PATENT DOCUMENTS

| | | |
|---|---|---|
| EP | 2278358 | 1/2011 |
| GB | 2427473 | 12/2006 |

OTHER PUBLICATIONS

International Search Report and Written Opinion mailed Dec. 2, 2011 in related International Patent application No. PCT/EP2011/052769.

(Continued)

*Primary Examiner* — Tung X Nguyen
*Assistant Examiner* — Thang Le
(74) *Attorney, Agent, or Firm* — Maschoff Brennan

(57) ABSTRACT

Electromagnetic proximity detection method for a buried structure executed with a mobile detection device, including sensing an electromagnetic field emitted from the structure as an analog electrical signal and digitalizing the analog electrical signal as a digital signal, performed after or while filtering the analog and/or digital signal. The proximity of the buried structure is determined by analyzing the digital signal, wherein the detection method can be alternatively executed in at least two of the following modes of detection: Power-Mode of detection, Radio-Mode of detection or Active-Mode of detection. An additional Switching-Mode of operation includes a repeated sequential detection in at least two of the mentioned modes of detection and is done by automatic subsequent alternating of the mode of detection with a minimum rate of alternation that an area of detection is coverable by the at least two modes of detection in a single execution of the detection method.

22 Claims, 9 Drawing Sheets

(56) References Cited

U.S. PATENT DOCUMENTS

| | | | |
|---|---|---|---|
| 4,600,356 A | | 7/1986 | Bridges et al. |
| 5,065,098 A | | 11/1991 | Salsman et al. |
| 5,194,812 A | | 3/1993 | Yokoi |
| 5,361,029 A | * | 11/1994 | Rider et al. .................. 324/326 |
| 5,592,092 A | | 1/1997 | Mechler |
| 6,313,755 B1 | * | 11/2001 | Hetmaniak et al. ........ 340/856.3 |
| 6,411,094 B1 | * | 6/2002 | Gard et al. .................. 324/326 |
| 6,437,726 B1 | | 8/2002 | Price |
| 7,021,403 B2 | * | 4/2006 | Brune et al. ................. 175/45 |
| 7,235,980 B2 | * | 6/2007 | Pearson et al. ............... 324/542 |
| 7,403,012 B2 | | 7/2008 | Worsley et al. |
| 7,675,289 B1 | * | 3/2010 | Stolarczyk et al. .......... 324/334 |
| 8,035,390 B2 | * | 10/2011 | Olsson et al. ................ 324/326 |
| 8,280,634 B2 | * | 10/2012 | Young et al. ..................... 702/5 |
| 8,353,365 B2 | * | 1/2013 | Mercer .......................... 175/45 |
| 2004/0145486 A1 | * | 7/2004 | Campbell et al. ............. 340/635 |
| 2004/0189322 A1 | | 9/2004 | Pearson et al. |
| 2009/0128156 A1 | * | 5/2009 | Li et al. ........................ 324/326 |
| 2010/0001713 A1 | * | 1/2010 | Royle ............................ 324/67 |

OTHER PUBLICATIONS

European Search Report completed Jan. 28, 2011 in related European Patent application No. EP 10 15 4738.

International Preliminary Report on Patentability mailed Aug. 28, 2012 for priority International Patent Serial No. PCT/EP2011/052769.

* cited by examiner

| Operation Setting | Power Mode | Radio Mode | Active Mode | Switching Mode |
|---|---|---|---|---|
| Aerial Tuning | Resonant 450/560 Hz | Flat 15 – 60 kHz | Resonant 8/44 kHz | Alternated |
| Filter Type | Narrow 450/560 Hz | Wide 15 - 60 kHz | Narrow 8/33 kHz | Alternated |
| Sampling Rate | ~1 kHz | ~120 kHz | ~66 kHz | Alternated |
| Processing Speed | LOW | HIGH | HIGH | Alternated |
| Detection Algorithm | Algorithm P | Algorithm R | Algorithm A | Alternated |

Fig. 6

| | | | |
|---|---|---|---|
| + | 1st | 7th | 13th | 19th |
| 0 | 3rd | 9th | 15th | 21st |
| − | 5th | 11th | 17th | 23rd |

Rotation sequences according to harmonic number

→ Rotates with fundamental
→ Does not rotate
→ Rotates against fundamental

|  | A 0° | B 120° | C 240° | A-B-C |
|---|---|---|---|---|
| Fundamental | | | | |
| 3rd harmonic | A' 3×0° (0°) | B' 3×120° (360°=0°) | C' 3×240° (720°=0°) | no rotation |
| 5th harmonic | A'' 5×0° (0°) | B'' 5×120° (600°=720°-120°) (-120°) | C'' 5×240° (1200°=1440°-240°) (-240°) | C-B-A |
| 7th harmonic | A''' 7×0° (0°) | B''' 7×120° (840°=720°+120°) (120°) | C''' 7×240° (1680°=1440°+240°) (240°) | A-B-C |
| 9th harmonic | A'''' 9×0° (0°) | B'''' 9×120° (1080°=0°) | C'''' 9×240° (2160°=0°) | no rotation |

Fig. 7b

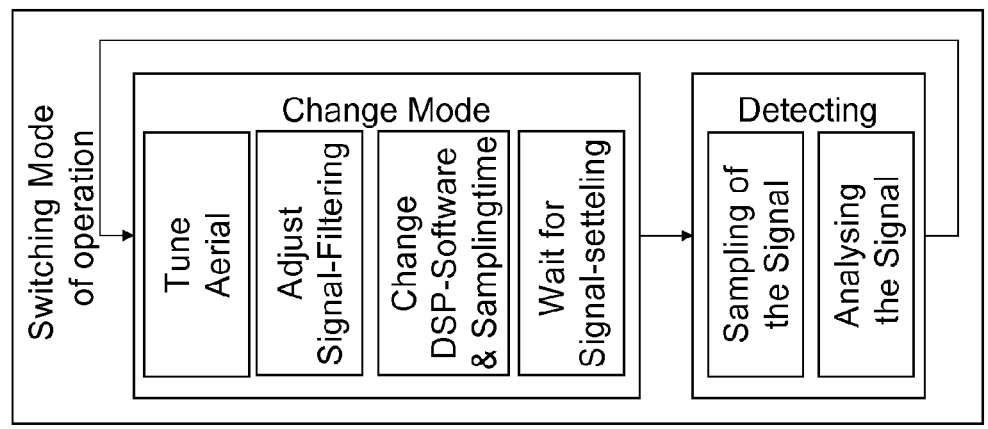
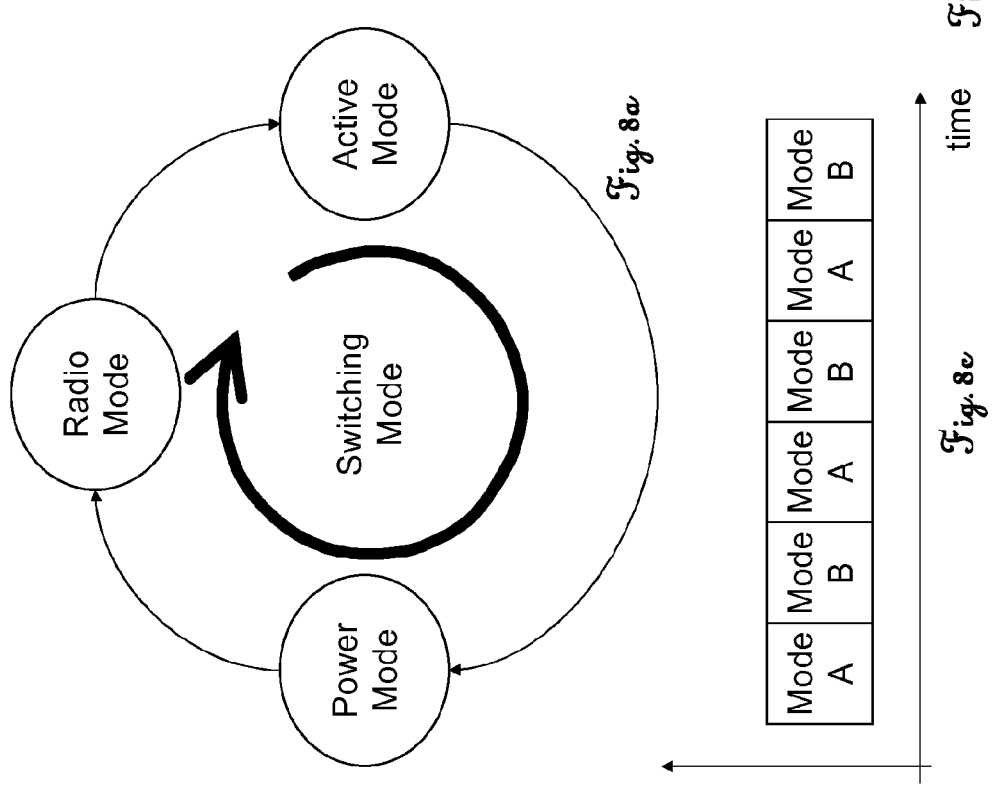
Fig. 8a
Fig. 8b
Fig. 8c

ELECTROMAGNETIC PROXIMITY DETECTION METHOD AND UNIT

FIELD OF THE INVENTION

The present invention relates generally to an electromagnetic proximity detection method for detecting a buried structure, such as an underground conduit or wiring system at a construction site, and to a buried structure detection-unit for such structures.

BACKGROUND

It is quite common on construction sites to use devices for detecting underground structures before or while digging. Such structures often occur in form of services for supplying electricity, gas, fuel, water, or communication data among other conductive, underground structures. Although the location of most of these services is already known from a surveyor's plan of the site, their locations can be uncertain or there could be additional services that are not mentioned therein. Often they are also simply overlooked by the operator of an earth moving machine during work.

The avoidance of damage to underground structures while digging in a trench or in areas being excavated is an important task. As damage to a service can cause serious impact and costs, additional measurements are taken to be able to detect the proximity, especially as an information of depth, of such services on the site before or while earth moving. Devices for this purpose are known as Cable Avoidance Tools also called CAT.

One way to locate underground services is to detect electromagnetic fields sent out by the service itself. To do this the service requires having a naturally occurring electrical signal which emits an electromagnetic field that is detectable above the ground. This works well for a switched on power supply line or a communication-cable being in use, but for example a wiring system of switched off street lights, unused or low-voltage communication cables, gas- or water-pipes can hardly be detected in this way.

Many different techniques have been developed for detecting those non-signal-carrying types of service as mentioned above as well. If the service itself is electrically conductive, an electromagnetic field can be introduced artificially as described in U.S. Pat. No. 4,438,401, which discloses a system wherein metallic services with no naturally occurring signals are directly connected to an electrical signal-generator. In this way an electrical signal can be coupled to the service, and therefore it is also possible to detect it by electromagnetic fields.

If this is not possible since the service is non-conductive, U.S. Pat. No. 5,194,812 shows a solution for making hollow pipes like gas or none-metal water pipes detectable by introducing a conductor into them—or by laying a conductor next to the service when it is buried—that will function as a transmitter for electromagnetic fields. In this way also a pipe not having a naturally occurring field by itself can be detected similar to conductive services by applying a detectable signal to the conductor inside or next to the structure.

As shown in the application EP 09166139 it is also possible to couple a field emitting signal into a conductive underground structure by introducing a current from an AC current-source into soil by earth-spikes or other ground connection means. As the current always takes the path of least resistance through soil, it will mostly flow along the conductive structure, since its resistance is lower than those of the soil-material. This way a conductive structure is detectable by its electromagnetic field although it neither naturally emits such, nor can a signal be directly conducted to it.

A further possibility for applying a signal to an underground service is to emit an electromagnetic field into the ground by a transmitting aerial. A receiving aerial or sensor in the detection device can then pick up the radio-signals reflected back by the underground structure, and, based on this information, the proximity of a service can be determined. The documents U.S. Pat. Nos. 4,600,356, 5,592,092 and 6,437,726 show such devices that for example are mounted on the bucket of a backhoe.

What all the mentioned detection systems have in common is that the underground structures need to emit an electromagnetic field that is strong enough to be detectable above the surface; especially it has to be detectable non-ambiguously in respect of the always present noise-floor of various other electromagnetic fields from other sources.

The electromagnetic fields emitted by the different services reside in different ranges of frequency dependent on the signals present on the service.

Power-lines commonly provide currents with a fundamental frequency of 50 Hz or 60 Hz, dependent on the country, and therefore emit fields with the same fundamental frequency.

In contrast thereto, the signals that are artificially applied to the structures (either by direct or by soil connection) are restricted in frequency by radio-communication-rules which are country-dependent and given e.g. to avoid interferences with radio communication services. In this case the field emitted by the structure has a frequency specified by the known signal being artificially introduced to the structure. A special example of frequencies allowed in the UK for a general geographic surveillance use, such as cable detection, are the frequencies of 8 kHz or 33 kHz, which are used by some CAT-equipment.

The frequency spectrum that is emitted from communication lines is another important detection target. The fields from such services can be expected to occur in certain ranges, whereby for those services no special single frequency can be expected, but rather a range of frequencies has to be taken into account. Especially the low wavelengths in the range of myriameter are recommended for geophysics since they penetrate soil material quite well and can therefore also be used for cable detection purpose.

To cover all those frequency ranges mentioned above, the known devices provide different modes of operation that can be exclusively selected of:

Power mode of operation, targeting electromagnetic fields from the alternating current flowing through power lines with a fundamental frequency of 50 Hz or 60 Hz.

Radio mode of operation, targeting electromagnetic fields in the VLF radio band range (=Very Low Frequency radio waves e.g. in the range of about 15 kHz to 60 kHz) as emitted by communication lines or similar services.

Active mode of operation, targeting an electromagnetic field of a known frequency which is specified by a signal being actively applied to the structure by radio, soil- or direct-conduction or by the introduction of a transmitting conductor inside of the structure, e.g. a 8 kHz or 33 kHz current applied to the structure by a current source.

The document U.S. Pat. No. 4,085,360 mentions a receiver instrument which consecutively or simultaneously listens to different frequency bands, one for mains at 50/60 Hz and one wide band from 1 kHz to 10 MHz.

US 2004/0189322 discloses a cable detection apparatus having a comb filter which is transmitting odd and attenuating even harmonics of the first frequency of the signal to be detected. By analysing fundamental and harmonics of the desired frequency, the SNR is improved.

A reason for the usage of different modes of operation is the fact that the accuracy of the proximity detection is strongly dependent on the signal to noise ratio of the signals being evaluated. As described in GB 2 427 473, the noise is scaling with the square of bandwidth and good detection results can be achieved when using a narrow band pass filter that dampens all frequencies except the ones of interest for the measurement (e.g. the 50 Hz or 60 Hz of mains in Power Mode or the 8 kHz or 33 kHz in Active Mode). The filtering can be done analog or digital, often also a combination of both kinds of filtering is used. A narrow band pass filter in this case is defined as a filter of a bandwidth which is lower than 10% of the centre frequency value, in particular lower than about 30 Hz.

A drawback of the narrow filtering on the other hand is that the area of interest has to be scanned more than once, each time for one of the different modes of operation for detecting all types of services in the small frequency bandwidth. This can be a time consuming and expensive process, especially when done by an experienced craftsman.

To overcome this drawback, there are devices known such as disclosed in U.S. Pat. No. 7,403,012, which contain three different detection paths in parallel in a single device. This approach is rather complex, power consuming and also expensive to build, since the whole signal conditioning and evaluation path—except the antennas that might be shared—has to be present three times.

SUMMARY

It is therefore an object of the present invention to improve the detection of underground structures.

Another object of the invention is to detect structures of different types in one detection step without the need of retracing the area of interest in different modes of operation.

A future object of the invention is also to reduce the complexity, size, effort and power consumption of the detection method or the device used for it.

A special object of the invention is to provide a proximity detection method with high detection accuracy for all types of services.

The electromagnetic proximity detection method for a buried structure such as an underground conduit or wiring at a construction site, is executed with a mobile detection device, by the steps of sensing an electromagnetic field emitted from the structure as an analog electrical signal by detection means such as aerials or sensors, and digitalizing the analog electrical signal as a digital signal in form of samples as digital values of the strength of the analog electrical signal taken with a determined sampling rate in time.

A step of filtering the analog and/or digital signal will be executed before or during the determination of the proximity of the buried structure by analysing the digital signal by a computation means according to an analyzing algorithm.

The detecting method can be alternatively executed in at least two of the following, in particular alternatively selectable, modes of detection:
 a Power-Mode of detection
  wherein electromagnetic fields with a fundamental frequency of mains supply are detected, in particular electromagnetic fields from power lines with a fundamental frequency of 50 Hz, 60 Hz or 16.66 Hz, or
 a Radio-Mode of detection
  wherein electromagnetic fields in a range of radio frequencies are detected, in particular electromagnetic fields from communication lines emitting radio frequencies in the VLF-band in the range of 15 kHz to 60 kHz, or
 a Active-Mode of detection
  wherein electromagnetic fields with a frequency specified by a known signal being artificially introduced to the structure are detected, in particular an electromagnetic field by an artificially introduced current with a specified frequency of about 8 kHz or 33 kHz,
wherein, an additional Switching-Mode of operation (or Alternating-Mode of detection) is introduced that is characterized by a repeated sequential detection in at least two of the mentioned modes of detection.

Therein, the Power-Mode of detection is detecting the structures (5, 10) only based on higher order harmonics of the fundamental frequency of mains supply.

This is done by automatic subsequent alternating of the mode of detection with such a minimum rate of alternation that an area of detection is coverable by the at least two modes of detection in a single execution of the method comprising the movement of the detection device over the detection area and thereby scanning the area of detection for underground structures. In particular the mode of detection is switched at least once per second, preferably faster, managed by a controller-unit, thereby making multiple structures which emit electromagnetic fields of different frequencies accurately detectable by moving the detection device only once over the area of detection wherein structures have to be detected and in particular also measured in depth.

The proximity detection method according to the invention is based on a new mode of operation, further referred to as Switching Mode of operation, in which the mode of detection is automatically and repeatedly alternated between at least two modes of detection with such a speed that the detection is experienced by the user as being simultaneous, allowing to scan an area of interest in multiple detection modes—"at once"—in a single scan, which means that the operator of the device has to move the detection device only once over the area of interest and thereby is able to accurately detect multiple types of services which are emitting electromagnetic fields, even if the fields have different fundamental frequencies.

Using "Switching Mode", wherein the data processing of the different modes of detection is sequential, but still fast enough so that the detection results will be experienced by the user as "simultaneous", which means that the user does not have to walk the detection area of interest as many times as if only one individual mode of detection could be selected. Still there is no need for parallel processing hardware that is not common in this field of application, since the used DSP or µP in general does not comprise parallel architectures. With the sequential approach there is no need for complicated and expensive parallel processing and also the overall computational effort can be reduced, resulting not only in lower costs but also in reduced power consumption, which is an important factor for mobile, battery-powered devices.

In switching mode each detection of the different frequencies is done with optimized detection parameters such as bandwidth, etc. resulting higher detection accuracy than possible when analyzing the full spectral range of all modes at once, especially regarding the achievable SNR, and also the power consumption can be lowered this way.

The exchange of the detection-algorithms and/or parameters used by the evaluation-unit when changing mode of detection is managed by the control-unit. The algorithms and parameters are comprised within a software product stored inside or outside of the device.

An undesired effect occurring thereby is the quite long time needed for the detection of low frequency signals such as power lines with a fundamental frequency of 50 Hz or 60 Hz.

After switching the detection mode to Power-mode, which includes a change in the program of the DSP and may a tuning of the aerials and the other options mentioned below, a settling time must be waited until the switching transients on the signal have faded. A 50 Hz signal has a signal period of 20 ms. If, for example four cycles are needed for settling and another four cycles for detecting and also some time for the switching itself is needed, a total time of about 200 ms might be needed for the whole step of switching and detecting.

At a frequency of 8 kHz in Active detection mode, having a period time of 125 µs, only a fraction of the time taken in Power mode is needed for such a step.

So in the example of switching between those two modes, a maximum update rate of approximately two or three times per second is reasonable, which is quite low to be experienced as simultaneous by the user.

Therefore, a reduction of the time needed for detection will bring further positive effects and one way to achieve such is the usage of a harmonic of the fundamental frequency in the slow and most time consuming power mode of detection.

For this particular application the $9^{th}$ harmonic of the fundamental frequency of mains has special positive characteristics and is therefore qualified, for the reasons explained in detail below, but other harmonics can do as well, although this special harmonic is one of the preferred embodiments.

The existence of the 9th harmonic is assured due to the presence of non-linear loads on the Power Lines. The presence of the 3rd and 9th harmonics is further assured as these are zero sequence harmonics, which are constructive as discussed in detail below.

In this application the sampling of the $9^{th}$ harmonic reduces the time taken in the Power mode of detection for sampling a reasonable number of signal periods for detection by 9 fold. In turn this allows the sequential sampling in more than one mode of detection with an improved switching rate, allowing to present the detection results to the user so that the detections appear to happen at the same time—"in parallel"—although still not being parallel at hardware and software level.

The term "Switching Mode" has been chosen for the case where multiple modes, e.g. the Power Mode and the Radio Mode, are executed sequentially and the information is presented to the user at quasi the same time.

By a further—maybe optionally—implemented aerial-"tuning" of the receiving characteristics of the detectors, an improvement in the sensitivity of the detection can be achieved. By using a simple capacitor- and/or resistor-circuit at the aerials an additional filtering and tuning of the frequency response of the system can be achieved. These capacitors and/or resistors can be quickly switched in or out of the circuit when changing modes to optimize the aerial according to the actually selected mode of detection and thereby e.g. tuning the aerial to a narrow frequency band at the $9^{th}$ harmonic in Power mode of detection or to an almost flat frequency response over the full detection-bandwidth of the Radio mode of detection.

Also a multi rate processing can be done optionally by changing the sampling rate of the ADC and/or the clocking rate of the DSP, dependent on the mode of detection actually used and thereby it optimizes the system for the resources actually required to fulfil the actual task and thereby the power consumption can be reduced and the battery life is increased, as e.g. the speed of sampling and/or data processing in Power mode of detection can be selected lower than in Radio mode.

An improvement of this method is that although the modes of detection are "combined", still each mode of detection will be executed with optimized parameters regarding sensitivity, power consumption, detection speed, etc.

Obviously those conversant with the art will appreciate that other applications using this harmonic sampling technique could be implemented.

The electromagnetic field emitted by a current in the structure is sensed by the detection-unit above the ground. The detection unit does not need a conductive connection to the soil and can therefore be moved without electrical ground contact. As already mentioned, the detection-unit comprises some kind of detector for sensing electromagnetic fields—such as aerials or other sensors for magnetic fields like a coil, a fluxmeter, a HALL/MR/GMR-Effect sensor or similar—which generates an electrical output-signal correspondent to the electromagnetic field. After some filtering and amplification and a digitalisation of the output signal, a computational unit analyses the signature of the digital representation of the electromagnetic field and detects the proximity of the buried structure as a distance-information and provides latter to the user.

The detection-unit is mobile, which means it can be constructed as a movable, hand held device that can be used to scan for services before or while digging. The actual detection method is executed while moving the detection device over the area to be observed—which is the area of detection wherein structures have to be detected—and the device informs the user of the actual proximity if a structure is present. The user can thereby locate and mark the location—and optionally also the depth—where an underground service is detected e.g. by paint, chalk, ribbons or stakes on ground, helping to avoid those structures in a subsequent earth moving process.

As a further option, the detection results can also be stored, especially in combination with some position information such as GPS-position data, on some storage media, allowing a further processing of the data and e.g. the generation of a map of the underground structures that can be included into—or matched with—working plans or surveyor's maps. This can also be done the other way round, wherein a map of known services is loaded onto the device and the operator is guided by the device to the expected location of the service from the map, according to the position information such as GPS data. Another useful effect can be gained as the full coverage of an area of interest can be ensured, as a part of the area left out while scanning can be identified based on the position information e.g. by indicating the already scanned area on a display. The usage and activity data of the device can be recorded and stored on the device or loaded from the device to a computer by a communication link, e.g. by Bluetooth. The usage data can then for example be used to verify if the instrument was actually used, and in combination with the above mentioned GPS-mapping also the area and time of usage can be verified. The usage data—as data log of site buried service location activity—can e.g. be valuable for insurance claims in case of an accident. Also, the user behaviour can be analyzed to determine if further training on the products usage is required. The system part for position information gathering can either be directly integrated into the detection device or be an optional, separate add-on part that can be attached to the detection device and which establishes a communication link to the controller unit of the detection-device either by wire or wireless connection.

The hand held device can optionally be equipped with a marking system located near the bottom of the device, automatically electromagnetically actuated, or manually actuated. It can comprise e.g. a paint sprayer tin or a releasing mechanism for some powder-like marking material (chalk, etc) for marking the surface below the device when a structure is detected. It can be automatically triggered by the electronics of the detection unit when a structure is detected. A benefit can be gained if the trigger-signal is evaluated by also taking into account some inclination sensor data (e.g. from an accelerometer or tilt sensor) in combination with the proximity detection results, e.g. by only triggering the marking system when the structure is—at least nearly—vertically below the detection device.

The marking system can also be manually triggered by the user pushing some button in range of the handles of the device. Also a button somewhere near the device's handles which mechanically actuates the marking mechanism, e.g. in form of some valve, at the bottom of the device next to central axis of detection, can be used. In switching mode of detection also the different types of structures being detected can be marked differently e.g. in colour or shape of the marking. The marking system can be directly integrated into the detection device or be attached by the user as a supplementary add on option.

By mobile device not only the man-operated version is meant, but also a detection device built to be directly attached to a shovel of an excavator or another earth moving machine such as a digger, dozer, backhoe or dredger allowing an on-line observation of the actual working area for underground structures during labour. As the device's range of detection wherein structures are detectable moves together with the tool, damage to underground structures can be efficiently avoided while working, without the need of a previous exploration step before the work commences. A mobilisation of the detection device by some dedicated means such as a carriage or an autonomous robot is another option.

In one possible embodiment, the electromagnetic field is detected by two aerials or sensors that are arranged in a known distance to each other. The distance to the structure as source of the electromagnetic field can be determined according to the difference in the strength of the signals picked up by the two aerials. Thereby not only the presence of a structure, but also its proximity can be determined and for example be presented to the user of the device by optical, acoustic or haptic means or be displayed as distance- (or depth-) information as a value in some unit of length.

As mentioned, the distance value can be evaluated according to the difference in signal-strength at a Bottom- and Top-aerial and distance of separation between them. In the formula (A) for calculating the distance value, the "Aerial_Seperation" is the spacing between the two aerials and the variables "Bottom" respectively "Top" stand for the strength of the electromagnetic field that is picked up by the corresponding top- and bottom-aerial.

$$\text{Depth} = \frac{\text{Aerial\_Seperation}}{\left(\frac{\text{Bottom}}{\text{Top}} - 1\right)} \quad (A)$$

The described evaluation is not restricted to the usage of two aerials or sensors. For example more aerials maybe aligned in different orientations, and the measured signals or values can be superimposed.

Beside the displaying of an exact distance value in some unit of length, it is also possible to present the distance only in rough steps such as: "NO SIGNAL", "FAR" (e.g. more than 3 m), "NEAR" (e.g. 3 m to 50 cm) or "SHALLOW" (e.g. less than 50 cm) to the user, since this information can be sufficient for some practical applications.

The detection-unit can issue a warning signal to the operator of the excavator when a structure is detected in close proximity of the detection-unit or another known reference point. An example for such a reference point is the tip of a bucket at an excavator with the detection unit fixed to its arm, in a known position relative to the bucket.

BRIEF DESCRIPTION OF THE DRAWINGS

The proximity detection method according to the invention and the devices and setup according to the invention are described or explained in more detail below, purely by way of example, with reference to working examples shown schematically in the drawing. Specifically.

FIG. 6 shows a table displaying different modes of detection and operation and examples of the settings used therefor in different system parts, according to the invention;

FIG. 8 shows an exemplary diagram of the order of events when using the proximity detection method in switching mode of operation according to the invention;

DETAILED DESCRIPTION

The diagrams of the figures should not be considered as being drawn to scale.

Figure 1:
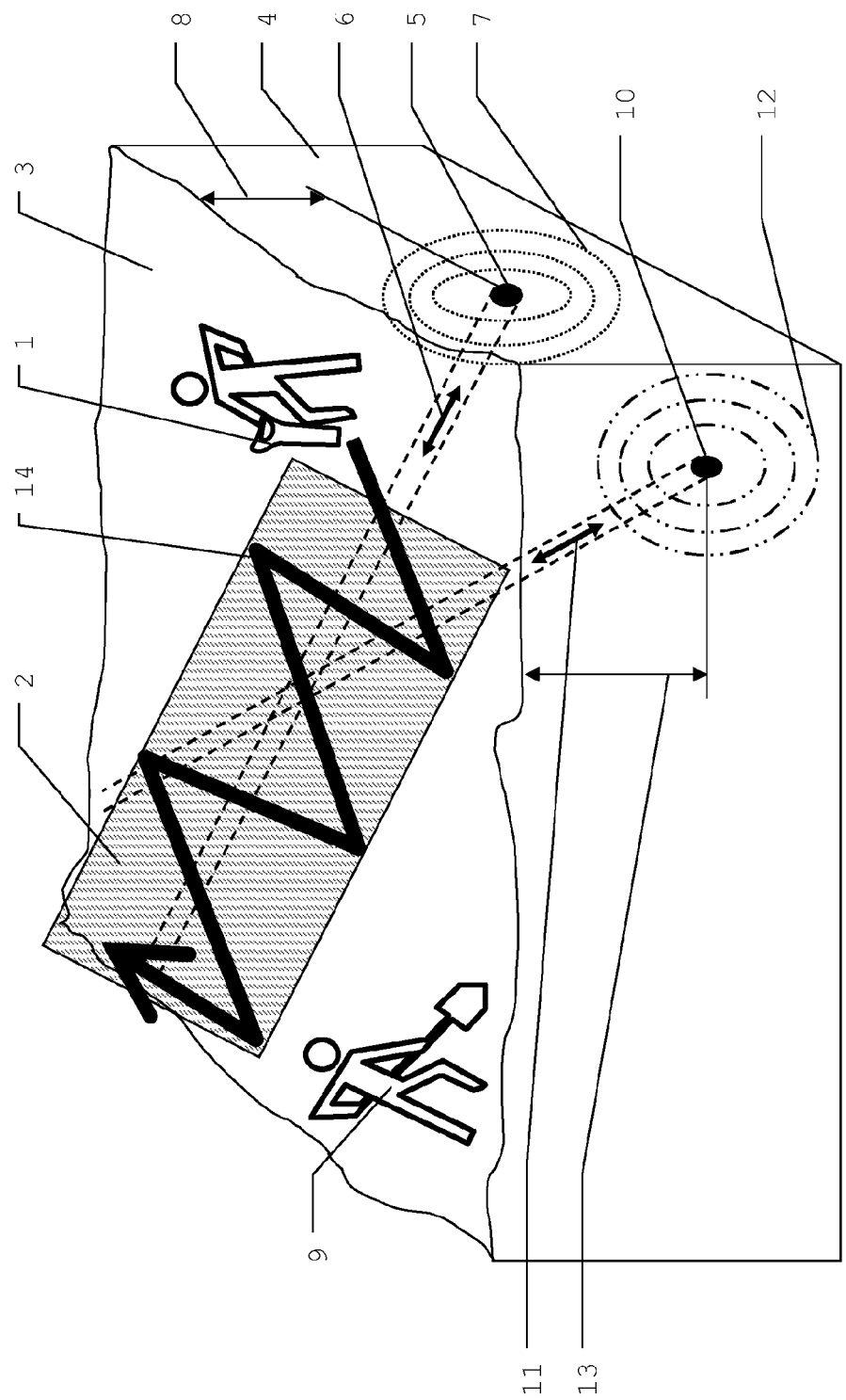
FIG. 1 shows an example of a typical setup on a construction site where the proximity detection method according to the invention is executed by man.

FIG. 1 shows, in a 3D cross-section view, an example of a construction site 3 where an area of detection 2 that has to be excavated by the worker 9 or by machine has to be scanned for underground services.

In the illustrated example, the buried structures 5/10 to be detected are underground services—a communication cable 10 and a mains supply line 5—as shown in the cross sections 4 of the soil and by the broken lines indicating their direction. The method is not limited to the detection of a certain number of underground structures 5/10.

Inside the power line structure 5 buried in a depth 8 an alternating current with a fundamental frequency of the 50 Hz mains is flowing as symbolized by the arrow 6 which is resulting in an electromagnetic field, symbolized by a section of the field lines 7.

Inside the communication cable structure 10 such as a telephone line buried in a depth 13 multiple alternating currents within a broad range of frequencies are flowing as symbolized by the arrow 11, resulting in an electromagnetic field, symbolized by a section of the field lines 12.

A craftsman is carrying a detection device 1 built for execution of the method according to the present invention. To scan the area of detection 2, he has to move the detection-unit 1 over the area of detection 2 as for instance indicated by the bold arrow 14. A commonly used practice when doing so is trying to follow the path of a structure once it has been detected by swinging the detection unit to and from and walking in the direction of the lowest distance-value measured—respectively the maximum signal strength. This detected path of the underground structure can be marked on the surface e.g. by poles, paint, chalk, ribbons or the like, whereby not only the path can be marked, but also the measured distance as information of depth 8/13 of the service 5/10 can be noted.

In previous art the craftsman had to execute this task of scanning the detection area in each of the modes of detection to ensure that all types of structures were covered.

According to the present invention, this can be omitted and the area of detection has to be scanned only once in Switching mode of operation, wherein a repeated alternation of the mode of detection is automatically executed by the device with such a rate that the craftsman experiences the detection as simultaneous. This saves time and also reduces the risk of varying coverage of the detection area in each scan by different paths taken.

Further not only the presence and depth of the underground structure can be determined thereby, but also the type of service found can be indicated by the device, according to the mode of detection in which the structure was detected. An indication of the type of service in addition to the presence and depth information of a service can be of great value, for example if the craftsman is explicitly looking for a certain type of underground service which e.g. has to be repaired.

A further positive effect in the case described above is that in switching mode of operation not only the one type of service actually searched for will be found as by the corresponding single mode of detection, but also another, possibly present service, such as a power supply line will be indicated by the detection device, whereby e.g. the risks of damage and/or an electric shock during digging can be omitted.

Not only the new Switching mode of operation is an improvement in the present application but also the single modes of detection—if statically used as known in prior art—are benefiting from the present invention because also in non-switching mode of operation, the whole circuitry of the device is fully optimized for the currently selected mode of detection, whereby the effects of e.g. optimized aerial tuning, reduced power consumption by accommodated sampling rate and/or optimized processing speed are fully efficacious.

Figure 2:
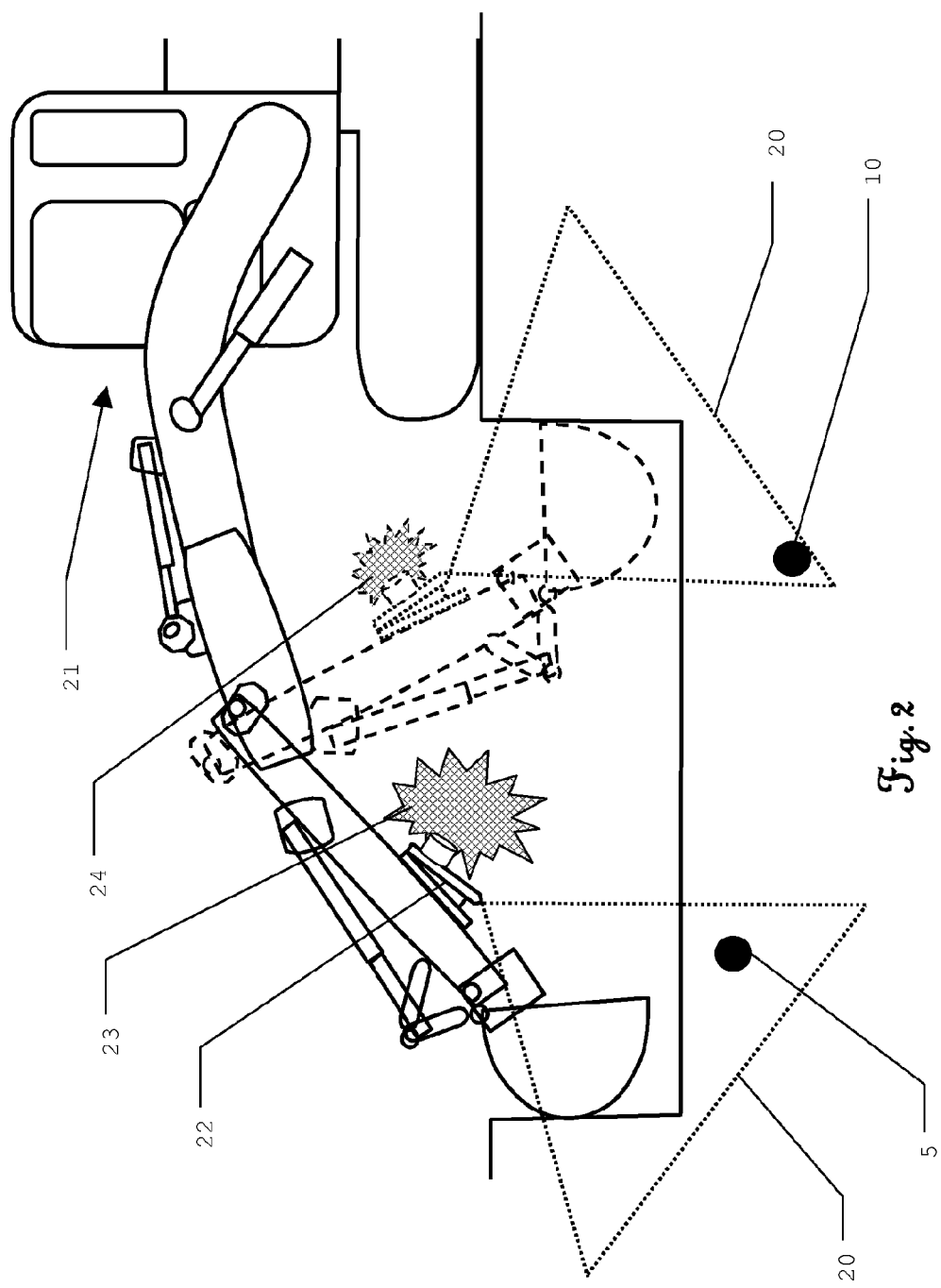
FIG. 2 shows an example of a typical setup on a construction site where the proximity detection method according to the invention is executed with the detection device mounted on an excavator.

FIG. 2 shows a close-up view of an excavator 21 equipped with a detection-unit 22 for executing the proximity detection method according to the invention. The structure 5 buried in the soil has an alternating electrical current flowing along it and is therefore emitting an electromagnetic field as described in detail above.

If the structure 5 gets into the range of the detection-unit 22 marked by dotted lines 20, a warning signal 23 alerts the operator of the proximity of a structure—an electrical power supply line in this case. In this way the operator can carry on his work with extreme caution or start to work the section close to the detected structure 5 by hand in order to avoid damage to the structure and the risk of an electric shock. In addition, as drawn in broken lines, also a communication cable 10 is buried inside the area to be excavated.

The detection device 22 capable of the switching proximity detection mode according to the present invention is capable of detecting both services at the same time, whereas it would be likely to overlook the communication cable 10 with a prior art detection unit that is operated in power mode of detection only—or vice versa—if the area is not scanned twice, resulting in additional costs and delay on the worksite that can both be avoided by the present invention.

If the electromagnetic field of the current inside the structure 5/10 is detected underneath the detection-unit 22 while digging, the warning signal 23/24 is issued. Such a warning can, for example, be an optical, acoustic, or haptic signal to the operator as well as an electrical signal that can, for example, be used to disable the excavator 21 or parts of it. Dependent on the actual mode of detection in which the structure was detected, the warning signal 23 can be varied to indicate the type of service as mentioned above. For this reason the warning 23 for the power line 5 is drawn different than the warning 24 of the structure 10 used for communication.

The warning signal 23 can also contain additional information about the proximity of the structure, for example a distance value from the structure to a defined reference point. If the distance between the structure 5/10 and the bucket of an excavator 21 as reference point is below some critical distance, a critical warning will be issued. The critical distance can either be defined as a fixed value, or set by the operator according to on site requirements. The critical warning can be issued in order to inform the operator of the fact that a structure is close to the actual working vicinity. Alternatively, the critical warning can also control a locking mechanism of the excavator 21 or parts of it in order to avoid a collision of the excavator's bucket and the structure 5/10.

The warning signal 23 can—as a special example—be issued similar to the warnings used in state of the art acoustic park distance controls in cars, where the repetition frequency or tone frequency of a beep is increased as progressing towards the target and finally turning into a continuous warning tone when the distance is below a certain critical threshold.

Figure 3:
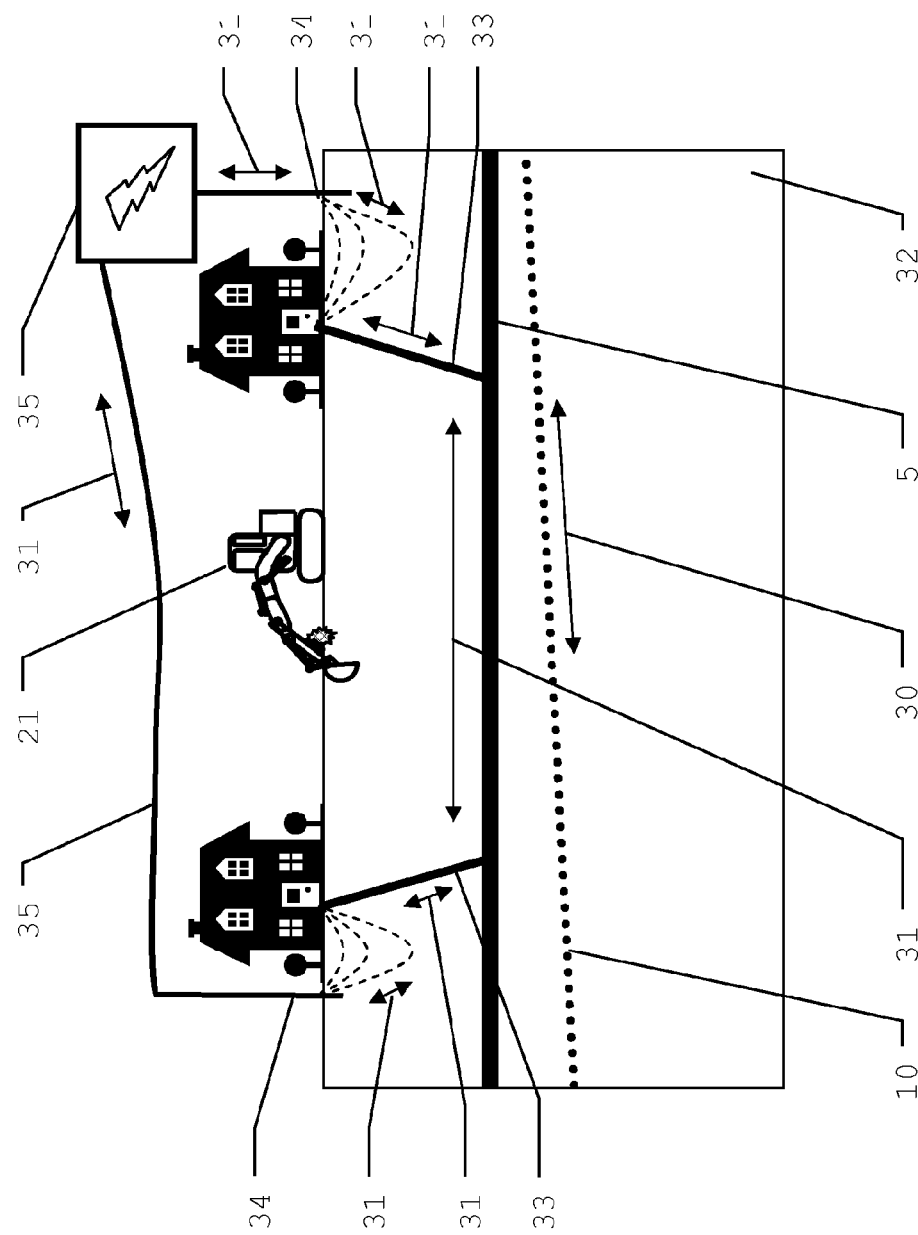
FIG. 3 shows an example of another setup on a construction site where the proximity detection method according to the invention is executed and an active introduction of the current to a conductive underground structure carrying no natural signal by soil conduction is used for making it detectable as well as the underground power line.

FIG. 3 shows a construction site 3 where it is known that there has to be a structure 19 in form of a plastic water conduit for connecting the water supply of the houses somewhere underground, but the actual location of it is not known. Therefore, a setup that introduces an alternating electrical current 31 of a known frequency of e.g. 33 kHz into the soil 32 by ground spikes 34 in some distance of the area to be excavated is used. As the main pipe 19 is connected by the pipes 31 to the houses, wherein they are grounded by domestic copper pipes, the current 31 from the current source 35 is flowing as indicated by the double arrows marked with 31. As the water inside the pipes 31/19/31 is the path of least resistance, most of the current 31 is flowing inside the pipes 31/19/31 and emitting an electromagnetic field of the known frequency of 33 kHz. A communication cable 10 also running in soil 32 is also emitting an electromagnetic field according to its current naturally occurring by usage.

The proximity detection method according to the invention, used in switching mode of operation, is capable of detecting all the structures 10/19/31 simultaneously and allows to avoid them during work e.g. with the excavator 21 to which the detection device is fixed or by a single manual pre-work scanning with a mobile detection device.

Also further structures such as mains supply lines, cast iron gas pipes, or the like would be detected in this way, each with the best detection accuracy possible, since each is detected in its dedicated mode of detection. In this example the communication line 10 is detected in Radio mode, designated for the reception of signals in a range of radio frequencies being commonly emitted by such underground services as e.g. the VLF-Band, whereas the water conduit 19 is detected in Active mode, sensitive for the known, single frequency produced by the signal source 35, in this case the mentioned 33 kHz.

As a very special embodiment, the detection unit can also be built to emit an electromagnetic field and detect whether a part of the field is reflected back by some underground structure to make conclusions about the presence of the structure. A combination of the detection of the natural, introduced and reflected electromagnetic fields can help to further ensure or improve the accuracy of the detection in some cases.

Figure 4:
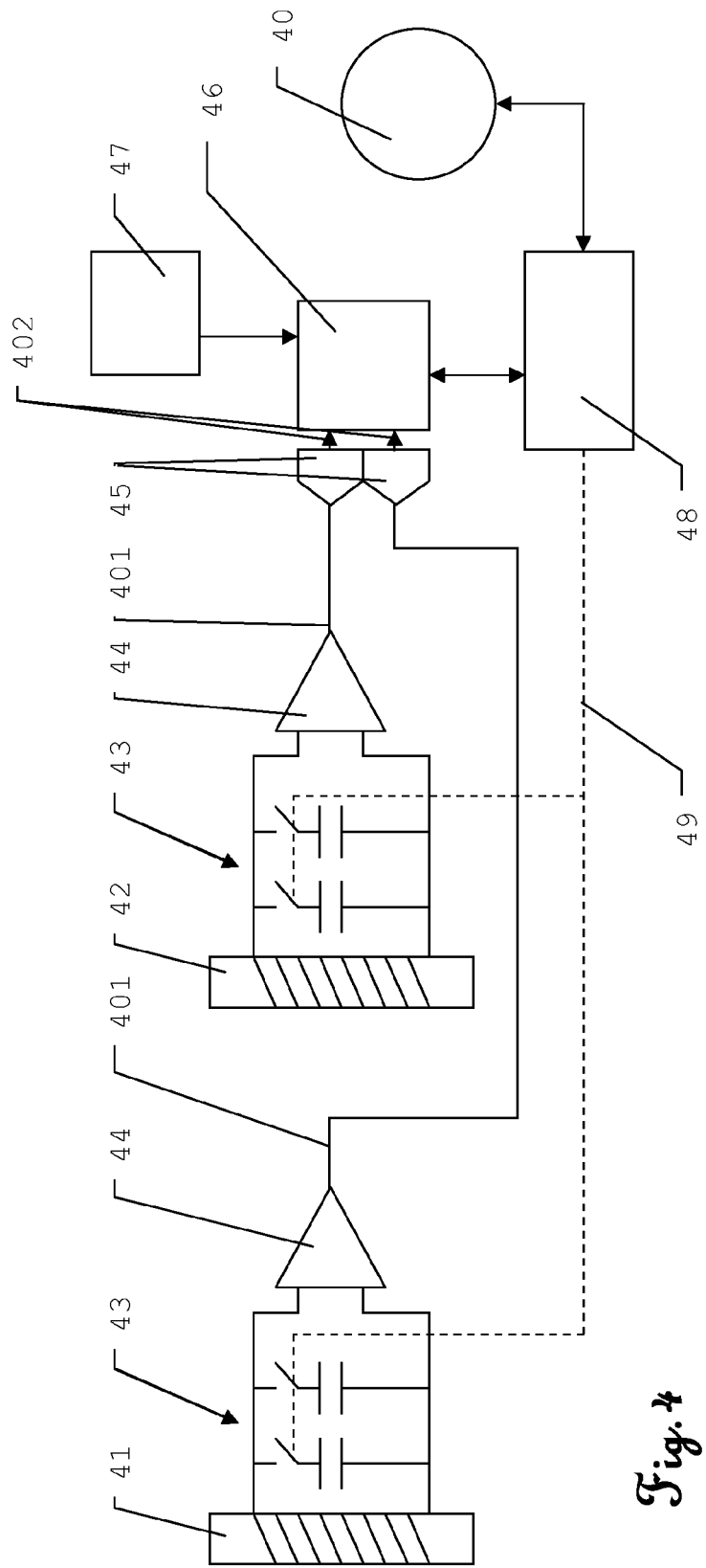
FIG. 4 shows a schematic of an exemplary detection device setup usable for the execution of the detection method according to the invention.

The symbolic diagram of a circuit in FIG. 4 shows an example of one possible implementation to be used for the proximity detection method according to the present invention.

In its simplest form shown here, there are two aerials—although a design with one aerial is possible too—which detect the electromagnetic signals emitted from the underground services. The aerials are "Tuned" using capacitors that can be switched under microprocessor control for different modes of detection. Thereby the frequency characteristics of the receiving path can be adjusted according to the actual mode of detection and the frequency band used in it. Also, the Q factor of the circuit can be modified as required by the addition of a resistor in parallel with the switched capacitors. The process is comparable to the functions of so called matchers-boxes for the antennas of ham radio stations although the actual purpose and the ranges of frequencies being used differ.

The signal from the aerial has to be amplified before entering an ADC analog to digital converter, which can be a separate chip or an integrated part of a Digital Signal Processor (DSP) depending on the hardware chosen. For example a 32 bit floating point Audio DSP with onboard 24 bit ADC is suited quite well for this application. The amplification can also be combined with an active or passive filtering of the analog signal, in particular for the purpose of avoiding aliasing effects by fulfilling the Shannon-Nyquist-Criteria when sampling the signal with the ADC. In one embodiment the tuning of the aerials can also include or be done by adjusting the amplification stage in gain and/or frequency characteristics.

The signal-strength from the aerial is proportional to the distance from the underground service, as known from theory of electromagnetic fields. The DSP is used to digitally filter the signals and calculate a ratio between the signal from a Top and a Bottom aerial in the detection device, arranged in a known distance to each other.

The expression for determining the distance from the Bottom Aerial to the underground service is given in formula (B) as:

$$\text{Depth} = \frac{\text{Aerial\_Seperation\_Distance}}{\left(\frac{\text{Bottom\_Signal}}{\text{Top\_Signal}} - 1\right)} \quad (B)$$

The DSP is used to digitally filter the signals and calculate the Ratio of the filtered Bottom and Top signals. The ADCs sampling rate is adjusted for the minimum sampling rate required for the maximum frequency of the selected mode to fulfil the Nyquist-Criterion and also to reduce power and resources consumed by the determination of distance. The processed data is transferred to a microprocessor, which applies some additional algorithms and drives a user interface providing the output data to the user, e.g. by displaying the determined distance of a service on an LCD-Screen.

The following modes of operation can be implemented:
a) Power Mode: 450 Hz or 540 Hz narrow band
b) Radio Mode: 15 kHz to 66 kHz wide band
c) 8 kHz narrow band
d) 33 kHz narrow band
e) Auto Mode: This continually switches between at least two of the modes a-d e.g. the Power and Radio Mode scanning both modes in real time and allowing the data to be presented to the user as though these modes were being processed in parallel.

Using this method there is no requirement for parallel processing, adopting a minimal approach to the design reducing cost and power.

The mobile detection-unit 3 for detecting the electromagnetic field 4 and determining the proximity of the structure 1 can comprise at least two sensors for the detection of electromagnetic fields, spaced apart in a known distance, whereby the proximity of the source of the electromagnetic field, in particular the electromagnetic field 4 emitted by the current 5 flowing along the structure 1, can be determined, according to the differences of the detected fields at the sensors.

Figure 5:
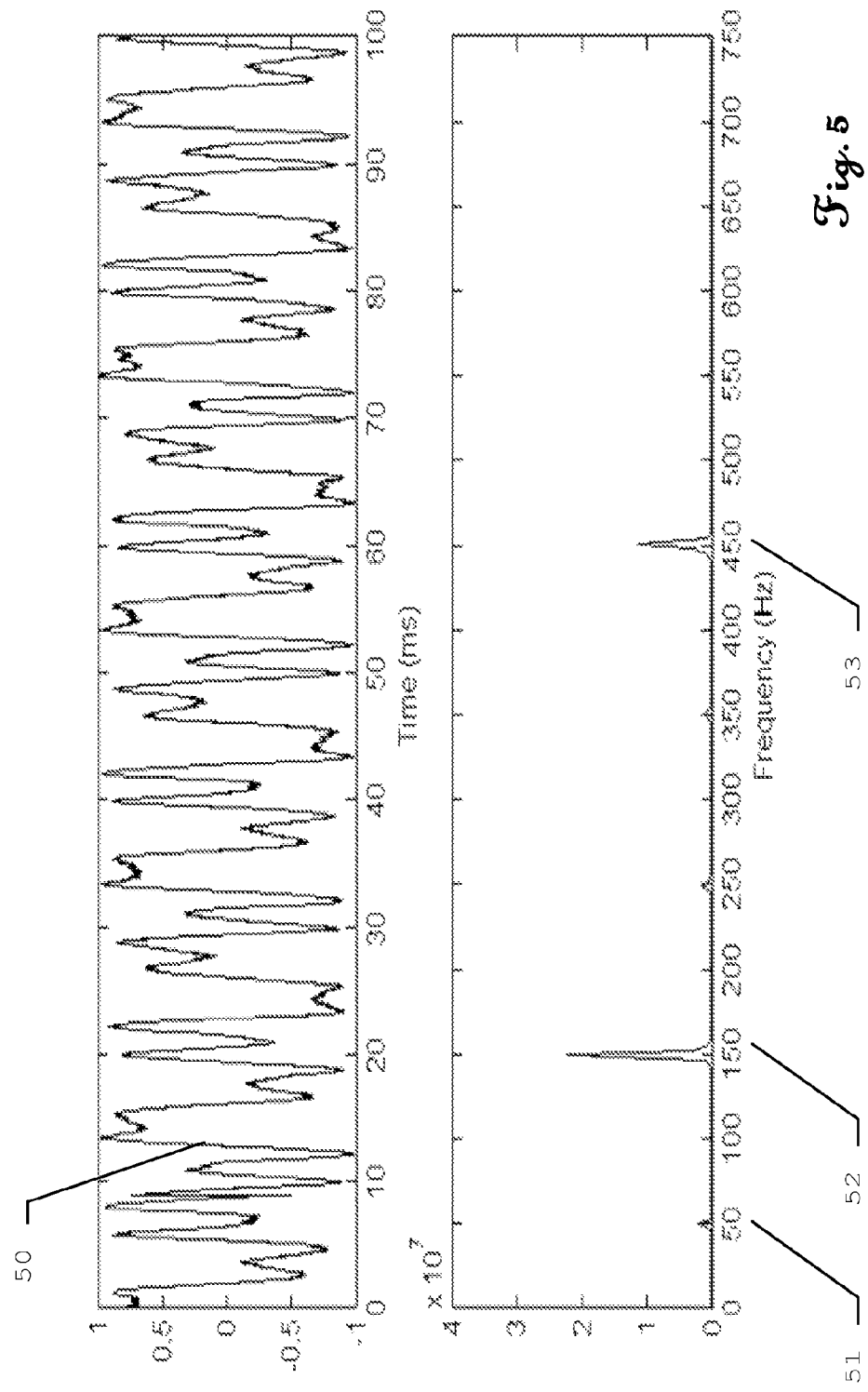
FIG. 5 shows a working example of the signals picked up by a receiving element of the detection device when a mains supply line is in detection range in time and frequency domain.

FIG. 5 shows a real signal 50 and its spectrum 51 collected at some construction site. The signal originates from an underground power cable supplying an office building with a three phase 50 Hz current. In the spectral view 51 the fundamental frequency 52 of 50 Hz is visible as well as the higher order harmonics, especially the $3^{rd}$ harmonic 53 and the $9^{th}$ harmonic 54 are clearly visible.

A possible explanation for the dominance of the harmonics in the signal is for once the better propagation of the signal and the improved sensitivity of the receiving aerial for those higher frequencies. A second explanation for this is the typical load-characteristic of an office that is dominated by the switching power supplies of the office equipment such as PCs, printers, etc.

As the $9^{th}$ harmonic is also a zero sequence harmonic as explained above, it is somehow predestined for the detection of power-cables, although the usage of the fundamental frequency or any other harmonic, as well as some combination of those frequencies is also possible.

FIG. 6 shows an exemplary table showing the modes of the device and some possibilities of optimisations to be made in each of the modes of detection. Different embodiments of the invention can implement only some of the optimisations while skipping others.

In the "Switching mode" column the word "Alternated" expresses that the mentioned setting is dependent on the actually active mode of detection. The actually active mode of detection can be one found in the columns before or also a further dedicated mode optimized for one or a plurality of signal frequencies.

The exemplary mentioned optimisation parameters in the table are:
The tuning of the receiving aerials respectively the whole receiving circuitry containing e.g. also amplification and filter components. According to the mode of detection this is optimized for the frequency or range of frequency to be of interest in the actual mode, especially by a switching of capacitors and or resistors or networks in the receiving section of the device. When using the $9^{th}$ harmonic in Power mode of detection this would be for example the shown 450 Hz or 560 Hz rather than the 50 Hz or 60 Hz when using the fundamental frequency for detection.

The adjustment of the filter type, whereby an adjustment of the frequency response (cut-off frequencies, bandwidth, Q-Factors, gain . . . ) is described exemplarily by the bandwidth and a rough indication of the pass band frequency or range of frequency. This filter can be an analog and/or digital filter, whereby digital filtering tends to allow stable, high order filtering that can be quite easily adjusted in its frequency response by a change of numerical parameters.

The Sampling Rate is adjusted to save energy and calculation effort by setting it to a frequency, whereby Shannon-Nyquist theorem is fulfilled for the range of frequency of interest, but not much higher. Therefore the values presented in the table are about twice the highest signal frequencies of the filtering. When using digital filtering except for the aerial tuning, the sampling rate has to be chosen higher for avoiding signal distortion due to aliasing, since this will not be effected by the digital filtering.

The speed of the computational unit can also be adjusted according to the sampling rate, since less data also requires fewer calculations per time. In this example this is done in two modes of LOW and HIGH clocking speed of calculation unit as the core of the DSP used for signal analysis.

The algorithm for the analysis of the signals can be adjusted, selected or replaced according to the actual mode of detection. This is illustrated by the terms algorithm P, R, A for the detection algorithms used in the respective modes of detection.

Figures 7A, 7C:
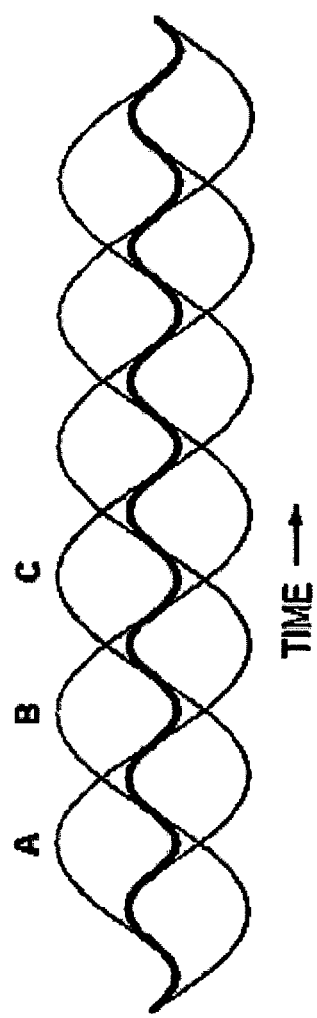
FIG. 7 a, b, c show figures and tables for an explanation of the harmonics sampling according to one aspect of the invention.

FIG. 7a exemplarily shows a figure of the currents in a three phase power system with phases A, B and C.

Although in general the energy in the $9^{th}$ harmonic is less than the energy in the fundamental frequency, because the sensitivity of the detectors for the electromagnetic fields increases for higher frequencies, there is no penalty when sampling the lower energy of the $9^{th}$ harmonic in terms of improved sensitivity. Further, a smaller detector could be used since the shorter wavelengths can be sensed with smaller receiving aerials.

The detection device 1, 22 according to the invention can therefore comprise aerials or sensors 41, 42 which have a size optimized for harmonics of the mains frequency rather than for the mains frequency itself, in particular for more than 300 Hz.

Selecting a specific frequency i.e. the $9^{th}$ harmonic, rather than a broad power frequency band, allows the use of a very narrow band filter for data processing, which increases the signal to noise ratio of the system as mentioned above. This leads to an increased certainty when calculating the distance to the underground service. As by a Narrow Band filter the certainty of depth estimation increases e.g. the determination of an "Avoidance Zone" of, say less than 0.3 m can be established to warn the user that a buried service is very close to the surface and a potential hazard exists when excavating.

A pure sinusoidal voltage is a conceptual quantity produced by an ideal AC generator built with finely distributed stator and field windings that operate in a uniform magnetic field. Since neither the winding distribution nor the magnetic field are uniform, voltage waveform distortions are created and the voltage-time relationship deviates from the pure sine function. The distortion at the point of generation is very small but nonetheless it exists, the voltage distortion therefore contains harmonics.

A sinusoidal voltage applied to a linear load means that the current drawn by the load is proportional to the voltage applied and the impedance of the load, the current waveform therefore follows the envelope of the voltage waveform. These linear loads do not distort a pure sine wave of a supply. Examples of linear loads are resistive heaters, incandescent lamps, and constant speed induction and synchronous motors.

Other loads can cause the current to vary disproportionately with the voltage. These loads are classified as nonlinear loads, and in this case the current and voltage have waveforms that are no longer exactly sinusoidal but contain distortions, whereby the fundamental (50 Hz or 60 Hz for Power) waveform has numerous additional waveforms superimposed upon it, creating multiple frequencies within the fundamental sine wave. The multiple frequencies are the harmonics of the fundamental frequency.

Examples of nonlinear loads are battery chargers, electronic ballasts, variable frequency drives and switching mode power supplies. As nonlinear currents flow through a facility's electrical system and the distribution/transmission lines, additional voltage distortions are produced due to the not perfectly matched impedances associated with the electrical networks. Thus, as electrical power is generated, distributed, and utilized, voltage and current waveform distortions are produced, which can be expressed as harmonic components of the fundamental frequency.

The harmonics of a three phase system can be grouped into positive (+), negative (−) and zero (0) sequence components.

Positive sequence harmonics (harmonic numbers 1, 4, 7, 10, 13, etc.) produce magnetic fields and currents rotating in the same direction as the fundamental frequency.

Negative sequence harmonics (harmonic numbers 2, 5, 8, 11, 14, etc.) develop magnetic fields and currents that rotate in a direction opposite to the positive frequency set.

Zero sequence harmonics (harmonic numbers 3, 9, 15, 21, etc.) do not rotate at all because they're in phase with each other.

In a three-phase power system, where phases A, B, and C are 120 apart, the third-harmonic multiples of those frequencies (180 Hz) fall perfectly into phase with each other. This can be thought of in graphical terms, and/or in mathematical terms:

Harmonic currents of Phases A, B, C all coincide, that is, no rotation.

If we extend the mathematical table to include higher odd-numbered harmonics, we notice a pattern with regard to the rotation or sequence of the harmonic frequencies:

Harmonics such as the $7^{th}$, which "rotate" with the same sequence as the fundamental, are called positive sequence. Harmonics such as the 5th, which "rotate" in the opposite sequence as the fundamental, are called negative sequence. Triple harmonics ($3^{rd}$ and $9^{th}$ shown in this table) which don't "rotate" at all because they're in phase with each other, are called zero sequence harmonics.

This pattern of positive-zero-negative-positive continues indefinitely for all odd-numbered harmonics, lending itself to expression in a table as to be found in the figures.

A useful effect of the Zero sequence frequencies for cable detection is that they are always in phase and therefore can not be cancelled out.

The FIGS. 7a, 7b and 7c are presented to explain the term "zero order harmonics" used in this document in more detail.

The table of FIG. 7b shows the three phases A, B and C and their corresponding phase angles. The direction of rotation therein is A-B-C, as shown in the last column.

In the rows below the same is shown for the $3^{rd}$, $5^{th}$, $7^{th}$ and $9^{th}$ harmonic to show that the direction of rotation for those harmonics varies or the resulting field does not rotate at all as in the case of the $3^{rd}$ and $9^{th}$ harmonic.

In FIG. 7c an assorted list of the harmonics according to their direction of rotation is given, wherein the "+"-row contains harmonics that are rotating in the same direction as the fundamental frequency and the "−" row contains the harmonics rotating opposite to it. The row labelled "0" lists the harmonics that do not rotate at all and are therefore called zero order harmonics.

Obviously the list of harmonics is not complete and can be extended up to higher orders if desired.

FIG. 8a shows an example of a possible sequence of mode of detection in the switching mode of operation in the detection method according to the invention. Therein the automatic repeated alternation between the Power mode, Radio Mode and Active mode are illustrated graphically. As already mentioned, the number of modes of detection used in switching mode can vary from only two up to an arbitrary number.

Since the frequencies of active mode can be covered by radio mode of detection too, an embodiment switching between power- and radio-mode only is one applicable solution. Some loss off sensitivity in comparison to the dedicated active-mode, resulting from the not as strongly optimized parameters such as filter-bandwidth or aerial-tuning, have to be considered, but can be overcome e.g. by ensure applying a strong enough signal in active mode.

The sequence diagram of FIG. 8b illustrates an example of the steps executed in the switching mode of operation by a repeated execution of the two main steps of changing mode and detecting. The changing mode can include the following steps but is neither limited to those, nor are all the steps exemplarily shown necessary. Also the order of events can be arranged differently than shown in the illustration.

Tune aerial to result in a receiving section of the device being optimized for the mode of detection being switched to, as described in detail above.

Adjust Signal-Filtering to optimize the conditioning of the signal for the mode of detection being switched to, as described in detail above.

Change DSP-Software for analysing and/or detecting as well as optimizing the Sampling Time adequate to the lowest sampling rate whereby the structure is accurately detectable by the mode of detection being switched to, as described in detail above.

Wait for Signal-Settling that might be caused by transients caused by the switching of detection mode and could result in distorted signals and corrupted proximity detection results.

The step of detecting comprises the receiving of a potentially present electromagnetic field that is emitted from a buried structure as an analog electrical signal by a tuned aerial and the digitalizing of the latter with the sampling time as a digital signal used for detecting the proximity of the buried structure by analysing the digital signal according to the algorithm of the DSP-Software.

Also filtering of the analog and/or digital signal according to the previously adjusted signal-filtering is comprised in the step of detection in this diagram, as well as the step of providing the results of detection to the user or to another means for further processing of the results.

In FIG. 8b this is illustrated by the two steps of sampling of the signal and analysing the signal for reasons of simplicity.

FIG. 8c shows a timing diagram wherein the alternation of only two modes of detection A and B is shown. The modes A and B could be the power and radio mode, the power and active mode, the radio and active mode, or also another dedicated detection mode such as e.g. telephone mode, cast pipe mode, network cable mode, etc. which is optimized for the respective type of structure to be detected.

What is claimed is:

1. An electromagnetic proximity detection method for a buried structure executed with a mobile detection device comprising the steps of:
   sensing an electromagnetic field emitted from the structure as an analog electrical signal;
   digitalizing the analog electrical signal as a digital signal;
   filtering the analog and/or digital signal;
   determining the proximity of the buried structure by analyzing the digital signal;
   wherein the detecting method can be alternatively executed in at least two of the following modes of detection:
      a Power-Mode of detection, wherein electromagnetic fields with a fundamental frequency of mains supply are detected; or
      a Radio-Mode of detection wherein electromagnetic fields in a range of radio frequencies are detected; or
      an Active-Mode of detection wherein electromagnetic fields with a frequency specified by a known signal being artificially introduced to the structure are detected,
   further comprising an additional Switching-Mode of operation wherein a repeated sequential detecting in at least two of the Power-Mode of detection, Radio-Mode of detection, and Active-Mode of detection is done by automatic subsequent alternating of the mode of detection, wherein the Power-Mode of detection is detecting the structures only based on higher order harmonics of the fundamental frequency of mains supply and the alternating of the mode of detection is done with such a minimum rate of alternation that an area of detection is coverable by the at least two modes of detection in a single execution of the method;
   and thereby making multiple structures which emit electromagnetic fields of different frequencies accurately detectable by moving the detection device only once over the area of detection.

2. A proximity detection method according to claim 1, further comprising:
   artificially introducing the known signal in the Active-Mode either by:
      electrically contacting the structure; or
      conducting through soil; or
      introducing a signal carrying conductor into the structure; or
      transmitting a modulated radio signal towards the structure;
      any combination of the latter.

3. A proximity detection method according to claim 1, wherein the harmonics are zero sequence harmonics of the fundamental mode of the mains supply frequency.

4. A proximity detection method according to claim 1, wherein the harmonics are zero sequence harmonics of the fundamental mode of the mains supply frequency, in particular whereby the harmonic is the 9th order of the fundamental frequency of mains supply.

5. A proximity detection method according to claim 1, wherein the alternating of the mode of detection comprises a tuning of a sensing circuit according to the actually active mode of detection.

6. A proximity detection method according to claim 1, wherein the alternating of the mode of detection comprises a tuning of a sensing circuit comprising the aerials or magnetic sensors by a switching of electronic components in the sensing circuit according to the actually active mode of detection.

7. A proximity detection method according to claim 1, wherein the filtering in Power-Mode and Active-Mode of detection is done by a narrow-band-filter for the electromagnetic field, the analog signal and/or the digital signal.

8. A proximity detection method according to claim 1, wherein the filtering in Power-Mode and Active-Mode of detection is done by a narrow-band-filter for the electromagnetic field, the analog signal and/or the digital signal with a bandwidth of less than 10% of its center-frequency and the characteristics of the filtering is changed according to the actually active mode of detection.

9. A proximity detection method according to claim 1, wherein the proximity is determined as a distance-information to the underground structure, in particular wherein a shallow-detect alarm is issued if the determined distance-information is below a certain threshold, in particular wherein the alarm is issued by optic, acoustic, haptic or electrical means.

10. A proximity detection method according to claim 1, wherein the proximity is determined as a distance-information to the underground structure, wherein a shallow-detect alarm is issued if the determined distance-information is below a certain threshold and the alarm is issued by optic, acoustic, haptic or electrical means.

11. A proximity detection method according to claim 1, wherein the sensing is done with at least two sensors or aerials arranged in a known distance to each other and the proximity of the structure is determined as a distance information according to the difference of energy between the signals from the sensors or aerials.

12. A proximity detection method according to claim 1, wherein the determining the proximity is done in frequency domain involving a mathematical transformation of the digital signal from time-domain into frequency domain.

13. A proximity detection method according to claim 1, wherein an indication of a type of underground structure is done according to the actually active mode of detection in which the structure is detected.

14. A proximity detection method according to claim 1, wherein adjusting the rate of digitalizations per second according to the actually active mode of detection.

15. A proximity detection method according to claim 1, wherein:
adjusting the calculation speed of a computation means according to the actually active mode of detection; and/or
adjusting an algorithm on the computation means used for the determination of the proximity according to the actually active mode of detection.

16. A proximity detection method according to claim 1, wherein mapping of the detection results to position coordinates of a position location system.

17. A proximity detection method according to claim 1, wherein mapping of the detection results to position coordinates of a GPS-device and/or velocity or acceleration sensor, for storing the mapping on a media.

18. A proximity detection method according to claim 17, wherein adjusting the alternating rate of mode of detection according to the speed of movement determined by the position location system and/or taking into account a sensed inclination of the device when determining the distance.

19. An electromagnetic proximity detection method for an underground conduit or wiring at a construction site executed with a mobile detection device, comprising the steps of:
sensing an electromagnetic field emitted from the structure as an analog electrical signal;
digitalizing the analog electrical signal as a digital signal;
filtering the analog and/or digital signal;
determining the proximity of the buried structure by analyzing the digital signal;
wherein the detecting method can be alternatively executed in at least two of the following alternatively selectable modes of detection:
a Power-Mode of detection wherein electromagnetic fields with a fundamental frequency of mains supply are detected using electromagnetic fields from power lines with a fundamental frequency of 50 Hz or 60 Hz; or
a Radio-Mode of detection wherein electromagnetic fields in a range of radio frequencies are detected using electromagnetic fields from communication lines emitting radio frequencies in the VLF-band in the range of 15 kHz to 60 kHz; or
an Active-Mode of detection wherein electromagnetic fields with a frequency specified by a known signal being artificially introduced to the structure are detected using an electromagnetic field by an artificially introduced current with a specified frequency of about 8 kHz or 33 kHz;
further comprising an additional Switching-Mode of operation wherein a repeated sequential detecting in at least two of the mentioned modes of detection is done by automatic subsequent alternating of the mode of detection, wherein the Power-Mode of detection is detecting the structures only based on higher order harmonics of the fundamental frequency of mains supply and the alternating of the mode of detection is done with such a minimum rate of alternation that an area of detection is coverable by the at least two modes of detection in a single execution of the method, in particular with a rate of at least once or ten times per second, and
thereby making multiple structures which emit electromagnetic fields of different frequencies accurately detectable by moving the detection device only once over the area of detection.

20. A buried structure detection-unit whereby a proximity of a structure is determinable as a distance information according to an electromagnetic field emitted from the structure, wherein the structure is an underground conduit or wiring system at a construction site, the detection-unit being movable above ground and comprising:
at least two aerials or sensors for sensing an electromagnetic field and providing a corresponding analog signal;
a digitalisation means, representing the analog signal as digital signal;
an evaluation unit built in a way to determine the proximity of the structure by analyzing the digital signals; and
a controller unit;
the detection-unit being operateable alternatively in one of at least two of the following detection modes:
Power-Mode of detection wherein electromagnetic fields with a fundamental frequency of mains supply are detected as electromagnetic fields from power lines with a fundamental frequency of 50 Hz or 60 Hz; or
Radio-Mode of detection wherein electromagnetic fields in a range of radio frequencies are detected as electromagnetic fields from communication lines emitting radio frequencies in the VLF-band in the range of 15 kHz to 60 kHz; or Active-Mode of detection wherein electromagnetic fields with a frequency specified by a known signal being artificially introduced to the structure are detected as an electromagnetic field by an artificially introduced current with a specified frequency of about 8 kHz or 33 kHz;

wherein the controller unit is built in such a way to automatic subsequent alternate between at least two of the detection modes in a switching mode of operation, wherein, in the Power-Mode of detection, the structures are detected only based on higher order harmonics of the fundamental frequency of mains supply; and the switching mode of operation alternates with such a minimum rate of alternation that an area of detection is coverable by the at least two modes of detection in a single move of the detection unit over the area of detection with a rate of at least once or ten times a second.

21. A buried structure detection-unit according to claim 20, wherein the switching mode of operation alternates with a rate of at least once or ten times a second.

22. A buried structure detection-unit according to claim 20, wherein the detection-unit comprises an aerial or sensor tuning-circuit of changeable characteristics that is controlled by the controller unit.

* * * * *